Figure 1:
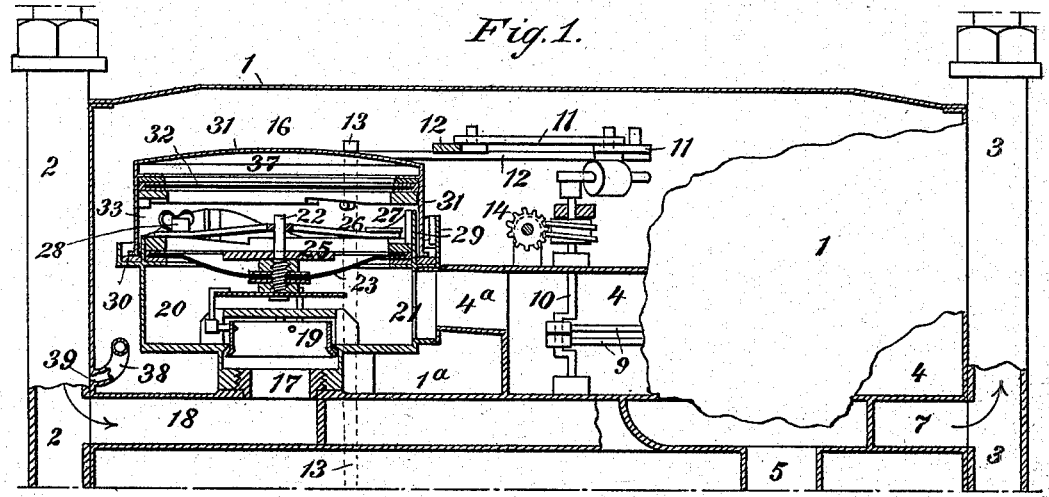

(No Model.)

M. SPITZER.
GAS REGULATOR AND METER.

No. 535,305.  Patented Mar. 5, 1895.

WITNESSES:
Donn Twitchell
William H. Hawton

INVENTOR
Maurice Spitzer
BY Alvin K. Goodwin
ATTORNEY

UNITED STATES PATENT OFFICE.

MAURICE SPITZER, OF NEW YORK, N. Y.

GAS REGULATOR AND METER.

SPECIFICATION forming part of Letters Patent No. 535,305, dated March 5, 1895.

Application filed June 7, 1894. Serial No. 513,824. (No model.)

*To all whom it may concern:*

Be it known that I, MAURICE SPITZER, a citizen of the United States, residing at the city of New York, county and State of New York, have invented certain new and useful Improvements in Gas Regulators and Meters, of which the following is a specification.

My invention relates to that class of regulators used for reducing and controlling the pressure of gases or fluids, illuminating gas, more particularly; and also to a peculiar combination of such a regulator device with or within a dry gas meter which has mechanism measuring and registering the volume of gas used by the consumer.

The invention has for its more special objects to promote durability of the valve controlling diaphragm of the regulator; to provide an effective barrier or safeguard against escape of noxious air contaminating fumes or gases from the apparatus; to effect a practical operative combination of a gas regulator with or within a dry gas meter and in such manner as shall assure perfect working of both meter and regulator and allow quick and easy discharge of liquid products of condensation from the combined apparatus, and also permit rough handling of the apparatus in transportation or by workmen and allow it to be set either level or out of level without harmful results.

Reference is to be had to the accompanying drawings, forming part of this specification, and in which similar reference numerals indicate corresponding parts in the several views.

Figure 2:
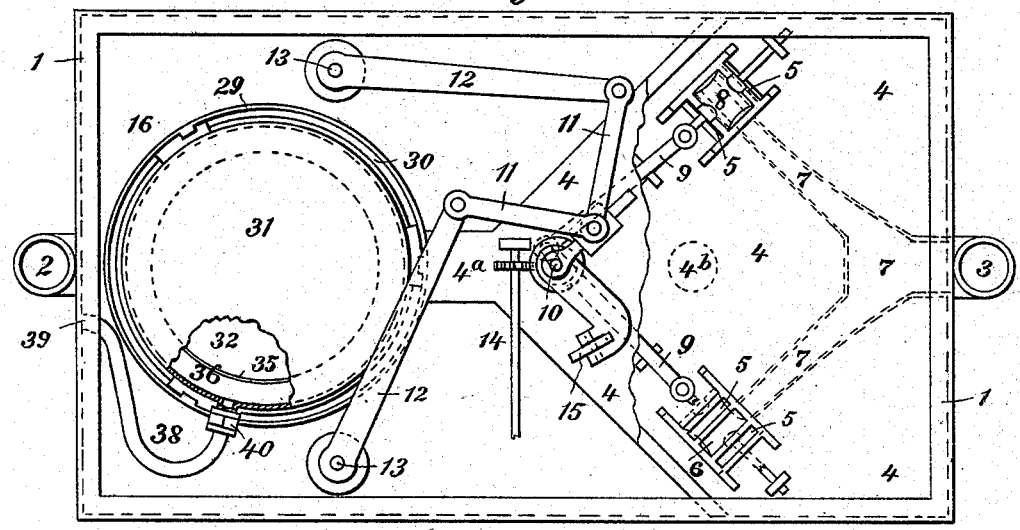
Figures 3, 4, 5:
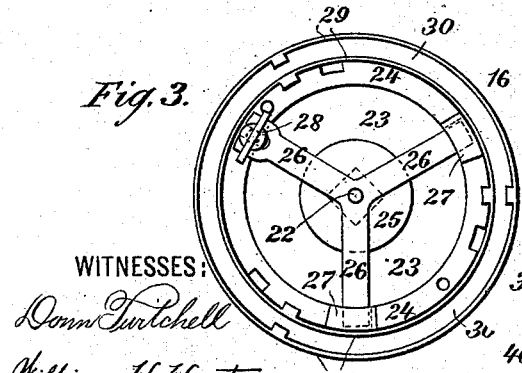

Figure 1, is a detail vertical sectional elevation of the upper portion of a gas meter with the pressure regulator connected in accordance with my invention. Fig. 2, is a plan view of the same with the top of the meter casing removed and parts broken away. Fig. 3, is a detail plan view of the regulator showing the adjustable guide for its inlet valve and diaphragm. Fig. 4, is a detail vertical sectional view illustrating a modification hereinafter described; and Fig. 5, is an enlarged detail sectional view at the joint of the vent device with the pressure regulator casing.

The casing 1, of the gas meter may have any desired form and may be fitted with any suitable interior mechanism or devices adapted for measuring and registering the gas or fluid admitted at the inlet pipe 2, and discharged from the outlet pipe 3. These pipes 2, 3, extend down nearly or quite to the bottom of the meter casing and each pipe is provided at or near its lower end with the usual removable plug, permitting drainage of the products of condensation from said pipes without disconnecting the meter.

The meter partly shown in the drawings has the usual standard rectangular general form and is provided in each of its two main lower divisions with a circular diaphragm having a collapsible peripheral rim. The upper gas receiving chamber 4, has two pairs of inlet ports 5, 5; 5, 5; two of which admit the gas into the two collapsible and expansible chambers formed inside the diaphragms, while the other two admit gas to the two spaces or chambers within the casing and outside of the diaphragms.

Two exhaust ports 6, 6, arranged between the pairs of ports 5, 5, open into the > shaped exhaust passage 7, which communicates with the gas outlet 3, of the meter. The ports 5, 6, are controlled by slide-valves 8, having usual form including a central exhaust chamber which receives the measured gas escaping through the adjacent pairs of ports 5, 5, alternately, and conducts it to the passage 7. The guided valve stems are coupled by links 9, 9, with a cranked shaft 10, carrying an upper rotating arm which is suitably connected by a couple of links 11, 11, to a pair of levers 12, 12, which are operated from shafts 13, 13, actuated by or from the reciprocating diaphragms. The shaft 10, is connected by ordinary worm and clock-work gearing 14, with the hands of the dials which register the consumption of the gas. The usual pawl detent 15, prevents reverse movement or action of the gas measuring and registering mechanisms.

All the above named parts 1 to 15, inclusive, are substantially similar to those in common use in meters of this character excepting that the chamber 4, receives the gas directly from the regulator 16, through a passage 4ª, instead of taking the gas from a horizontal passage through an opening which I have for convenience only, shown by a dotted line at 4ᵇ, in Fig. 2 of the drawings.

The gas regulator 16, has a bottom inlet at 17, at its screw collar connection with an upper horizontal partition 1ª, of the casing 1. This inlet opening 17, communicates with a passage 18, which receives the gas from the inlet pipe 2. The gas entering the regulator at its opening 17, escapes upward through the usual two-seated or any other suitable valve 19, into the lower chamber 20, of the regulator and passes thence through the side opening 21, of the regulator and the passage 4ª, into the receiving chamber 4, of the meter, whence it escapes through the ports 5, 5, and as permitted by the valves 8, 8, to the two pairs of lower measuring chambers and thence through the exhaust ports 6, passage 7, and pipe 3, to the discharge pipe which supplies the burners. The stem 22, of the valve 19, is clamped by nuts to the center of the ordinary parchment or leather diaphragm 23, which is confined in the regulator casing by a clamp ring 24, which preferably has inclined faces wedging under fixed lugs on the casing as the ring is turned a little by a suitable wrench. The valve stem 22, is adapted to receive one or more weights 25, which, by controlling the opening movement of the valve 19, determines the pressure at which the gas is allowed to pass the valve, the weights being adjusted to or removed from the valve stem as any given pressure in the inlet pipe 2, may require. The valve 19, and diaphragm 23, are of ordinary construction.

I have arranged a simple and effective guide which promotes or maintains proper working of the regulator diaphragm 23, and the valve 19. In the present preferred construction I extend the stem 22 of the inlet valve upward sufficiently to loosely enter an aperture forming a bearing at the center of a three-armed spider frame 26, which is removably held to the diaphragm clamp ring in the following preferred manner: All the arms or peripheral portions, but one, of the frame 26, (two arms in this instance,) pass snugly underneath clips 27, fixed to the diaphragm clamp ring 24, and the remaining arm is slotted or otherwise suitably fitted to be engaged and securely fastened to the clamp ring by any suitable device such as a thumb-screw or set-screw 28. Upon loosening this screw the guide frame 26, may be shifted around beneath the clips 27, to the best position to bring its central bearing to the proper place relatively to the valve stem to assure true and easy rise and fall of the valve, whereupon this single screw 28, is tightened on the guide to lock it and maintain true operation of the valve and connected diaphragm. Figs. 1, and 3, of the drawings fully illustrate this feature of construction.

I am aware that a relatively stationary bearing has heretofore been arranged in the gas way for the stem of a valve connected to the diaphragm of a gas pressure regulator, but I am not aware that a relatively stationary bearing for the valve stem and diaphragm has heretofore been located between two opposing diaphragms or beyond a single main diaphragm, in order to protect the bearing and valve stem from exposure to the gas, thereby preventing sticking of the valve stem in its guide by avoiding deposits thereon from the gas. My invention therefore embraces any form of guide for the valve and diaphragm when said guide is located between two opposing diaphragms or beyond one main valve controlling diaphragm and out of the gas way, to prevent the valve from sticking fast in the guide.

Between two horizontally convoluted upper rim portions 29, of the lower part of the regulator casing is placed a packing 30, upon which tightly fits the lower edge of the cap portion 31, of the casing. Inclined lips on the cap wedge underneath lugs on the casing rim to lock the cap to the packing with an air tight joint. In the preferred or most approved form of my invention this cap 31, is fitted with an upper or supplemental diaphragm 32, which may be made of leather, rubber or any other suitable air tight material, and thus forms an intermediate chamber 33, in the regulator casing between the two diaphragms 23, 32. This supplemental or protecting diaphragm 32, is preferably clamped at its frame by a suitable ring 34, to a packing 35, resting underneath an interior ledge or flange 36, on the cap 31. This flange 36, is preferably some little distance below the top of the cap thereby forming another chamber 37, within the regulator casing above the supplemental diaphragm 32.

Vent is given by means of a tube 38, which is connected at one end with the cap 31, and at the other end with the meter casing 1, so as to communicate with an orifice 39, made through the casing, thus venting the regulator chamber 37, to the atmosphere through the casing or wall of the meter. The vent tube 38, may be made of lead or some suitable flexible material and of sufficient length to allow disconnection of the cap 31, to give access to the valve stem 22, for adjusting the pressure regulating weights 25, thereon without compelling disconnection of the vent tube at the regulator or meter casing; or the vent tube may be fitted with a union coupling 40, next the regulator.

Venting an air chamber above or beyond the main diaphragm 23, of a pressure regulator of this character, and through the casing or wall of a meter within which the regulator is placed, is a special feature of my invention, whether the regulator be fitted with one or more supplemental diaphragms 32, above or beyond the main diaphragm 23, as shown in Figs. 1, 2, 3, and 5, of the drawings, or whether the supplemental diaphragm is dispensed with, as in the modification shown in Fig 4, of the drawings, wherein the vent tube 38, is connected to a lower or more shallow regulator cap 31, and communicates with an air space or chamber 37ª, formed between the main diaphragm 23, and the cap, said tube also communicating with an orifice 39, of the meter casing.

It is common to provide a vent opening of some kind through the casing of a gas pressure regulator to permit a diaphragm to rise and have closing effect on a gas inlet valve attached to it. I also am aware that two opposing diaphragms have been used in a gas governor or pressure regulator, but both diaphragms have been rigidily connected to the stem of the inlet controlling valve. In one construction the two diaphragms are held a slight distance apart by nuts on a solid valve stem, the object being to prevent leakage by utilizing the farther diaphragm should the diaphragm nearest the valve break. In another instance two diaphragms of unequal areas are connected to a hollow valve stem in order to get full pressure of the gas on the outside faces of both diaphragms and have this pressure on their unequal areas control the movements of the valve. I also am aware that a displaceable fluid, or in other words, a fluid which can be spilled out of operative relation with the other parts, has been used in pressure regulators and in connection with an inverted cup or float and a diaphragm, in order to fluid-seal the foul air in the regulator casing beyond the valve controlling diaphragm and prevent escape of said noxious or contaminating air to the atmosphere, and also to protect the diaphragm against evaporation of its preserving infiltrate. I also am aware that a pressure regulator has been placed within the air-tight casing of a dry gas meter, but in this prior combination the regulator casing is open at the top, thereby exposing the valve controlling diaphragm. Hence, any gas which would leak from the adjacent valve box or measuring chambers of the meter into the upper chamber in which the regulator is placed, would exert varying pressure on the outer face of the diaphragm and more or less counteract the pressure on its inner face by the gas passing the inlet valve, thus impairing or destroying the usefulness of the diaphragm as an inlet valve controlling device. Furthermore, no vent is given from beyond the outer face of the diaphragm to the atmosphere, which omission of itself would prevent movement of the diaphragm and render the regulator inoperative. Another disadvantage of this prior combination as compared with present requirements, is that no provision is made for directly pouring liquid condensation products from the meter, and due probably to the fact that following earlier methods of making illuminating gas from coal, the condensation products collected in the meter were of pasty consistency and not sufficiently fluid to be directly poured or spilled from the meter pipe connection, and could be removed most conveniently by a scraping or analogous process after the meter was taken apart.

My invention is readily distinguishable from the above named prior structures. As regards the regulator itself when provided with the two opposing diaphragms 23, 32, which closely confine between them an elastic body of air or fluid, it will first be seen that this air or fluid is nondisplaceable, or in other words, it cannot be spilled out of operative relation with the regulator box or casing and the two diaphragms and the gas inlet valve coupled to the lower diaphragm. Furthermore, this nondisplaceable or closely confined body of air or fluid does not circulate over the top surface of the lower main diaphragm. Hence evaporation of the oil or other preservative infiltrate from this diaphragm is more certainly prevented and the diaphragm is made more durable than is possible when it is exposed directly to the air through a vent orifice of the regulator casing, or when it is exposed indirectly to the atmosphere through the medium of an air sealing fluid. It will also be noticed that the two opposing diaphragms and the nondisplaceable body of air confined between them, and with only one of the diaphragms connected to the gas inlet valve of the regulator and meter, makes a very simple and efficient buffer device which assures the most sensitive action of the valve. Furthermore, the confined body of air cannot freeze or be otherwise affected so as to unfavorably influence the pressure regulating action. Furthermore, escape of noxious vapors from the main diaphragm to the atmosphere is prevented. These results are attained whether the regulator be set outside of the meter and be air-vented directly through the casing cap 31, or whether the regulator be sealed within the gas meter casing and be air-vented by the tube 38, and orifice 39, through the wall of the meter casing.

I also specially mention the fact that when the regulator is combined with and within the meter casing, the single diaphragm, or the upper one of the two diaphragms, is tightly closed in by the regulator casing cover 31, through which vent is given by the pipe 38 and meter casing orifice 39, to allow free operation of the regulator valve controlling diaphragm. By thus inclosing the regulator diaphragm and cutting off communication between the regulator casing and the chamber of the meter in which the regulator is placed, it is impossible for gas which has leaked in around the regulator from the other portions of the meter to have injurious effect on the gas-inlet controlling diaphragm or any other part of the regulator.

The absence of a displaceable fluid from the interior of the regulator is of the first importance when the regulator and meter are combined in accordance with one part of my invention, and when it is desired or necessary to invert or tip the meter to fully drain off all products of condensation from the whole apparatus. Obviously, this total discharge of condensation products could not be safely effected by inverting or tipping the meter should the inclosed or connected regulator contain a displaceable liquid air seal, as the sealing liquid would then be spilled out of operative relation with the other parts of the regulator, but with the two opposing diaphragms confining a body of nondisplaceable air or fluid between them, the meter may be tipped sidewise or inverted, and all liquid products of condensation will thereby be drained off through the passage 4ᵃ, and regulator chamber 20, past the valve 19, and through the passages 17, 18, and finally from the pipe 2, without interfering in the least with the adjustments of the sensitive diaphragms or breaking the air seal of the main diaphragm and without disturbing the fixed connections of the regulator at 17, 4ᵃ, with the portion 1ᵃ, and gas receiving chamber or valve box 4, of the meter. The absence of a displaceeable fluid air seal from the regulator also allows the combined regulator and meter to be set more or less out of level without impairing the sensitive working of any part of the apparatus.

I specially mention the construction whereby practically direct outlet communication is provided between the valve box or interior of the gas meter, the regulator and a connection pipe, such as 2, of the meter. By providing this passage, either through 14ᵃ, 17, 18, or in any other equivalent manner, any unskilled workman or attendant may easily and quickly drain off practically all the products of condensation, after the meter is disconnected, by simply tipping it over toward the side next the discharge pipe 2, and without disturbing the regulator or requiring special adjustment of any part of the combined apparatus. In fact the fluid condensation products may be discharged quite as easily from the meter as is possible were the regulator not combined therewith.

It will be seen that with the meter and regulator connected as herein shown and described, the regulator may at moderate expense be fitted to or within existing standard meters. In fact the drawings were made from such a combined apparatus somewhat hastily and crudely and therefore not conforming as regards details, to the better finished and more cheaply made apparatus I propose to adopt in practical use. Hence the details of construction may vary considerably, within the scope of my invention.

In so far as some features of my invention are concerned, the pressure regulator may be arranged outside of the meter casing and be connected with the gas inlet and receiving chambers of the meter, or may be connected at the gas outlet, or in fact anywhere in or on the pipe leading to the burners, and in any case the operation will be substantially as above described; but I consider that the arrangement of the regulator within the meter casing is especially practical and valuable because of the protection thus given the regulator against injury and against being tampered with, and also on account of the saving of space in setting up one meter or a number of meters side by side, and also because of the convenience and inexpensiveness of the connections of the regulator with the meter.

Should the regulator be arranged within the meter casing so as to regulate the gas pressure at a place beyond that where the gas is measured in or by the meter, the bottom opening at 17, would connect the regulator with the opposite passage 7, or an extension thereof, and the side opening 4ᵃ would communicate directly with the other or opposite pipe 3 of the meter, as will readily be understood, but the arrangement of the regulator to connect with the inlet pipe 2, as shown in the drawings, and to control the pressure of the gas prior to measuring it in the meter, is preferred in practice.

Having thus described my invention, I claim as new and desire to secure by Letters Patent—

1. The combination, with a meter, of a pressure regulator inclosed within the meter casing, and a vent device communicating with the interior of the regulator casing and opening to the atmosphere through the wall of the meter casing, said regulator casing inclosing the regulator inlet controlling device and cutting off communication between said device and the meter chamber in which the regulator is placed.

2. The combination, with a meter, of a pressure regulator inclosed within the meter casing, and a vent device communicating with the interior of the regulator casing at a point outside of or beyond its valve controlling diaphragm and communicating with the atmosphere through the wall of the meter casing, said regulator casing inclosing the valve controlling diaphragm and cutting off communication between it and the chamber in which the regulator is placed.

3. The combination, with a meter, of a pressure regulator inclosed within the meter casing and having a main diaphragm, an inlet valve connected to said diaphragm, a guard or protector device shielding the outer face of the diaphragm from air currents, and a vent device communicating with the interior of the regulator casing at a point outside of or beyond the guard or protector of the main diaphragm and communicating with the atmosphere through the wall of the meter casing, said regulator casing having a closed cover or part cutting off communication between the guard or protector device and the meter chamber in which the regulator is placed.

4. The combination, with a meter, of a pressure regulator inclosed within the meter casing and provided with a main diaphragm and a supplemental protecting or guarding diaphragm; and a vent device communicating with the interior of the regulator casing at a point outside of or beyond the supplemental diaphragm and communicating with the atmosphere through the wall of the meter casing.

5. A combined gas pressure regulator and meter in which the regulator is inclosed within the meter casing, the gas receiving and measuring compartments of the meter being connected with the regulator by a direct passage, substantially as described, whereby condensation products may be easily discharged from the meter and regulator by inverting or tilting the apparatus.

6. A combined gas pressure regulator and meter, in which the regulator is inclosed within the meter casing; the regulator having an inlet valve, a diaphragm connected to the valve, a casing inclosing and shielding the diaphragm, and cutting off communication between it and the meter chamber in which the regulator is placed and a vent from the regulator casing to the atmosphere from beyond the diaphragm, said regulator also having a bottom opening admitting gas under full pressure, and a side opening discharging the gas under regulated pressure.

7. A combined gas pressure regulator and meter, in which the regulator is inclosed within the meter casing and has a bottom valved inlet communicating with a service connection pipe of the meter, a side outlet communicating with the chamber which conducts the gas, when under pressure controlled by the regulator, to the measuring compartments of the meter, a yielding diaphragm or device coupled to the valve and controlling the gas pressure at the inlet, said controlling device being cut off by the regulator casing from communication with the meter chamber in which the regulator is placed and a vent from an inclosed chamber of the regulator beyond the diaphragm to the atmosphere.

8. A gas or fluid pressure regulator, provided with a main diaphragm, an inlet valve connected thereto, and a supplemental protecting diaphragm disconnected from the valve and located opposite the main diaphragm and confining a body of nondisplaceable air or elastic fluid between the two diaphragms.

9. A gas or fluid pressure regulator, provided with a main diaphragm, an inlet valve connected thereto, and a supplemental protecting diaphragm disconnected from the valve and located opposite the main diaphragm and confining a body of nondisplaceable air or elastic fluid between the two diaphragms, vent being given the regulator casing from an inclosed chamber outside of or beyond the supplemental diaphragm.

10. A gas or fluid pressure regulator, provided with a main diaphragm, an inlet valve connected thereto, and a supplemental diaphragm held independently in a removable frame and located opposite the main diaphragm and confining a body of nondisplaceable air or elastic fluid between the two diaphragms.

11. A gas or fluid pressure regulator, provided at a point beyond its valve controlling diaphragm with a relatively stationary bearing which guides the movements of the valve and diaphragm without coming into contact with the gas.

12. A gas or fluid pressure regulator, provided with a main diaphragm, an inlet valve connected thereto, a supplemental protecting diaphragm disconnected from the valve and located opposite the main diaphragm and confining a body of nondisplaceable air or elastic fluid between the two diaphragms, and a relatively stationary guide for the valve and main diaphragm located in the chamber between the two diaphragms.

13. A gas or fluid pressure regulator, provided with a main diaphragm, an inlet valve connected thereto, a removable supplemental diaphragm disconnected from the valve and located opposite the main diaphragm and normally confining a body of nondisplaceable air or elastic fluid between the two diaphragms, and one or more removable weights adapted to the valve or diaphragm and having opening effect on the valve.

14. The combination, in a gas regulator, of a two-part casing, one part having gas inlet and outlet passages, a valve, and a diaphragm connected to the valve; the other separable part of the casing having a supplemental protecting diaphragm and a vent orifice above or beyond it, the chamber between the two opposing diaphragms normally confining a nondisplaceable body of air or elastic fluid.

15. The combination, with the pressure regulator diaphragm and the stem of the valve it controls, of a guide for the valve comprising a frame or part having an aperture receiving the valve stem, clips confining the main outer portions of the guide, and a clamping device locking the guide.

16. The combination, with a gas meter having inlet passage 2, a gas receiving chamber 4, and suitable outlets for the measured gas, of a pressure regulator located within the meter casing and provided with a valve controlling diaphragm 23, an opening or passage below said diaphragm to the meter inlet 2, and an opening at 4ª, to the gas receiving chamber 4 of the meter, whereby a direct passage is formed through 4ª, the regulator casing and the inlet 2, for drainage of condensation products from the meter and regulator.

17. The combination, with a gas meter having inlet passages 2, 18, and outlet passages 7, 3, with communicating valved ports, said meter also having gas receiving chamber 4, with opening 4ª, of a gas regulator communicating at 17, 21, with the passages 18, 4ª, and provided with a valve next the inlet 17; and a diaphragm 23, controlling said valve, the regulator casing having an upper chamber 37ª, beyond the diaphragm 23, and a vent 38, 39, between said chamber 37ª, and the atmosphere.

18. The combination, with a gas meter having inlet passages 2, 18, and outlet passages 7, 3, with communicating valved ports, said meter also having gas receiving chamber 4, with opening 4ª, of a gas regulator 16, communicating at 17, 21, with the passages 18, 4ª, and provided with a valve next the inlet 17, and also having two diaphragms 23, 32, confining a body of air between them; the regulator casing having a chamber 37, above the diaphragm 32, and a vent 38, 39, from said chamber 37, to the atmosphere.

19. The combination, with the pressure regulator diaphragm and the valve controlled by it, of a spider frame 26, loosely fitting the valve stem, clips 27, on the diaphragm frame or clamp ring with which the frame 26, interlocks adjustably, and a clamp device as 28, locking the guide to the diaphragm frame or ring.

MAURICE SPITZER.

Witnesses:
ARTHUR W. HASTINGS,
ARTHUR BOURNE.